(12) United States Patent
Fritschi

(10) Patent No.: US 6,431,056 B1
(45) Date of Patent: Aug. 13, 2002

(54) DEVICE FOR INFUSING DRINKS

(76) Inventor: Isidor Fritschi, Im Langwingerten 4, CH-8540 Andelfingen (CH)

( * ) Notice: Subject to any disclaimer, the term of this patent is extended or adjusted under 35 U.S.C. 154(b) by 0 days.

(21) Appl. No.: 09/701,919

(22) PCT Filed: Jun. 1, 1999

(86) PCT No.: PCT/CH99/00237

§ 371 (c)(1),
(2), (4) Date: Jan. 23, 2001

(87) PCT Pub. No.: WO99/62388

PCT Pub. Date: Dec. 9, 1999

(30) Foreign Application Priority Data

Jun. 2, 1998 (CH) .............................................. 1194/98

(51) Int. Cl.⁷ ............................. A47J 31/20; A47J 31/52
(52) U.S. Cl. ............................. 99/320; 99/319; 99/317; 99/279
(58) Field of Search .................... 99/320, 319, 318, 99/317, 323, 279

(56) References Cited

U.S. PATENT DOCUMENTS

| | | | | |
|---|---|---|---|---|
| 996,305 A | * | 6/1911 | Bachelder | 99/320 |
| 1,362,644 A | * | 12/1920 | Sprague, Jr. | 99/320 |
| 2,065,149 A | * | 12/1936 | Newman | 99/320 |

FOREIGN PATENT DOCUMENTS

| | | |
|---|---|---|
| DE | 27 58 184 A1 | 6/1979 |
| DE | 29 04 569 A1 | 8/1980 |
| DE | 44 32 547 A1 | 3/1996 |
| EP | 0094368 A2 | 11/1983 |
| WO | WO 95/07648 A1 | 3/1995 |

* cited by examiner

*Primary Examiner*—Reginald L. Alexander
(74) *Attorney, Agent, or Firm*—Edwin D. Schindler

(57) ABSTRACT

The device for brewing beverages includes a brewing receptacle (1) and an associated brewing sieve (2) in the form of a porous holder (2) for the material requiring brewing (7). It has mechanical-hydraulic device for automatically and adjustably ending the brewing process. This device includes a holder (2), which has a lighter specific weight than water, and can be introduced into brewing receptacle (1), as well as a weighing-down element (11), by way of which holder (2) for the material requiring brewing (7) can be kept submerged in the brewing liquid (9) in the brewing receptacle (1) for a pre-set length of time. The weighing-down element (11) includes of an upwardly open container (28) filled with water, which rests on holder (2) and has an opening (29) at the bottom through which the water (30) in the weighing-down element can flow into insert ring (3). As soon as container (28), and hence holder (2) as well, is relieved of the weight of the water in container (28), holder (2) begins to rise up and lifts the material requiring brewing (7) out of brewing liquid (9).

13 Claims, 11 Drawing Sheets

DEVICE FOR INFUSING DRINKS

BACKGROUND OF THE INVENTION

1. Technical Field of the Invention

Figure 1:
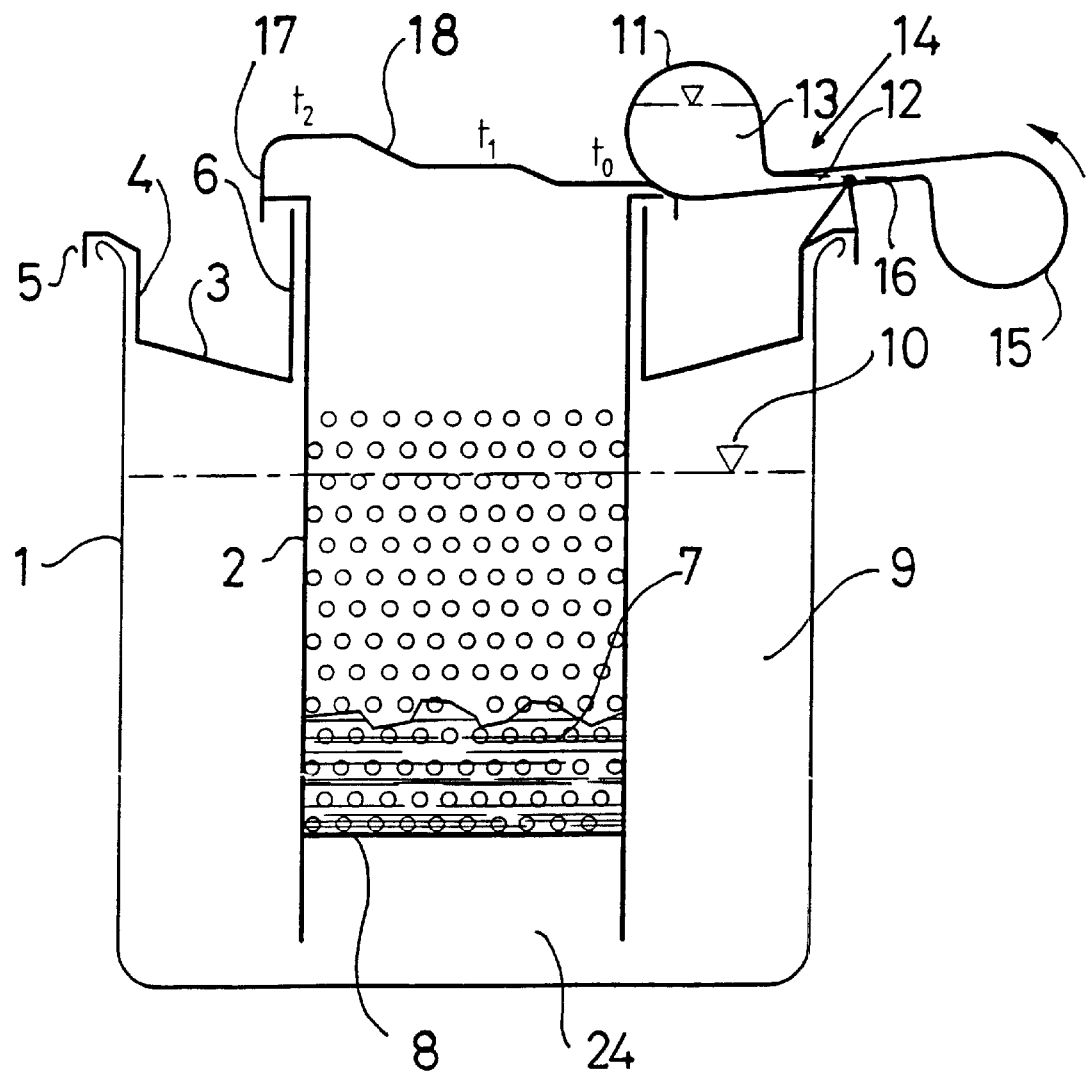

This invention concerns a device for brewing beverages, whether in individual portions, or for several portions together. The invention is especially oriented towards brewing tea in all its variations, although the device can equally be used to brew other drinks as well.

2. Description of the Prior Art

Tea is conventionally prepared using a variety of methods. In addition to the temperature of the brewing water, the composition and quality of the tea and the ratio of tea to brewing water, the decisive and most important factor impacting on the quality of the flavour of the tea is always the duration of the brewing period. This is particularly true of black tea. Any tea-lover knows this and, when brewing tea, will pay great attention to the length of the brewing time. The disadvantage of having to concentrate on the brewing time, however, is that one has little opportunity to engage in other activities during this period.

Tea is usually prepared by inserting tea into a porous brewing element such as a hollow, perforated two-part tin receptacle hanging by a chain which is then suspended in the hot water in the tea glass or teacup. At the end of the desired brewing period, the brewing element is removed by the chain from the tea glass or teacup, and the tea is ready to be drunk. The brewing time is often monitored with an electronic kitchen timer of the type also used for boiling eggs or baking cakes, etc. The brewing time is set on the timer, whereupon the timer is started. At the end of the pre-set period, i.e. when the brewing time is over, the timer emits an audible signal and the brewing operation can be interrupted. If one does not happen to be in the immediate vicinity of the timer, however, the signal can go unheard, in which case the tea will unavoidably remain too long in the brewing water. Another method of preparing tea is to submerge a pre-packed paper tea bag in the drinking receptacle containing the hot water and then remove it at the end of the ideal brewing time. It is for this purpose that these tea bags are often attached to a thread at the end of which there is a label so that the thread can be hung over the edge of the drinking receptacle with the label outwards. Here, too, however, there has to be some means of monitoring the brewing time, and it is important to intervene immediately after the brewing time comes to an end, i.e. to remove the tea leaves from the brewing water, thereby concluding the brewing process. If one fails to monitor the brewing process carefully, or if one lets oneself be distracted, for example, the brewing time is often exceeded and the flavour of the tea suffers as a result. Nevertheless, it is irksome to have to concentrate specially on such an elementary operation as measuring the passage of time, and to have to simply wait inactive for the required amount of time to pass.

A remedy can be found in electric appliances which, amongst other things, allow the user to pre-set the brewing time, at the end of which the appliance automatically interrupts the brewing process. Electrical appliances, however, have several disadvantages: firstly, they require an electrical supply point, secondly, the mode of operation often requires explanation and can often be too complicated for people who do not use the appliance regularly, and, thirdly, they are expensive to purchase. And finally, electric brewing devices do not really fit with the image of the committed tea-drinker.

There have already been proposals for various non-electric devices for brewing beverages which stop automatically at the end of the brewing time. DE 29 04 569, for example, discloses a device for selecting the brewing time for hot drinks which has a floatable tea container inside the brewing receptacle and an anchoring element at the bottom of the brewing receptacle which counteracts the buoyant force exerted on this tea sieve float. An actuating element that reacts to heat, e.g. expanding bellows or a bimetal, releases the anchor, whereupon the floatable tea container rises up, thereby separating the material requiring brewing from the liquid. It has, however, proved costly to manufacture a reliably working actuating element.

WO95/07648 discloses a beverages brewing method for preparing cup-sized portions of coffee in coin-operated machines. The method works with two containers positioned inside each other and at a distance from each other, with the top one having a double bottom made from filter material, between which ground coffee is enclosed, and the other one serving as a disposable cup. The hot water runs through the filter material and the ground coffee trapped inbetween, and drips into the cup. When the liquid level reaches the filter material, the top container begins to float until a hydrostatic balance is achieved between the hot water in it and the coffee in the cup, and hence outside the top container. This method is intended to be used for automatic dispensing machines and is not suitable as a simple device for preparing individual cups of tea, e.g. at home or at work.

SUMMARY OF THE INVENTION

Based on this state of the art, the invention is based on the object of creating a simplified device for brewing beverages. Firstly, with this device there should be no need to intervene at the end of the brewing time, because the brewing process should stop automatically, so that, once the brewing process has been started, one can leave the device on its own without running the risk of allowing the brewing process to go on for too long. Furthermore, it should also be possible to pre-set different brewing times, and the structure and mode of operation of the device should be as simple as possible so that the way it functions is selfexplanatory, and can be understood immediately by everyone.

The foregoing and related objects are achieved by the present invention, which provides a device for brewing beverages comprising a brewing receptacle and an associated brewing sieve in the form of a porous holder for the material requiring brewing. The invention includes mechanical-hydraulic means for automatically and adjustably ending the brewing process. These means comprise a holder, which has a lighter specific weight than water, and which can be introduced into the brewing receptacle, as well as a weighing-down element, by which the holder for the material requiring brewing can be kept submerged in the brewing liquid in the brewing receptacle for a pre-set length of time. The weighing-down element includes an upwardly open container filled with water, which rests on the holder and has an opening at the bottom through which the water in the weighing-down element can flow into an insert ring. As soon as the upwardly open container, and hence the holder, as well, are relieved of the weight of the water in container, the holder begins to rise up and lifts the material requiring brewing out of brewing liquid.

BRIEF DESCRIPTION OF THE DRAWING FIGURES

Figure 2:
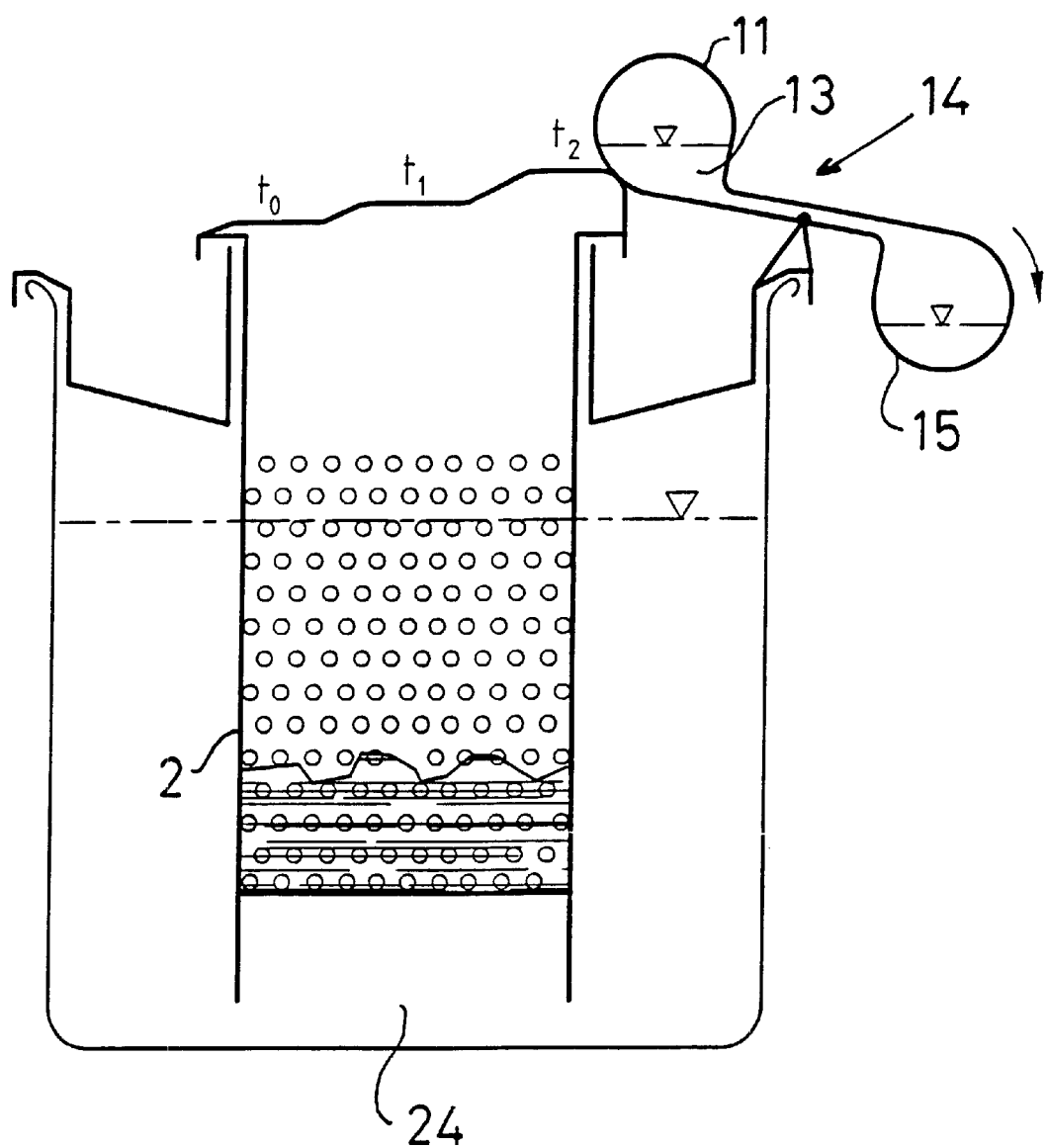
Figure 3:
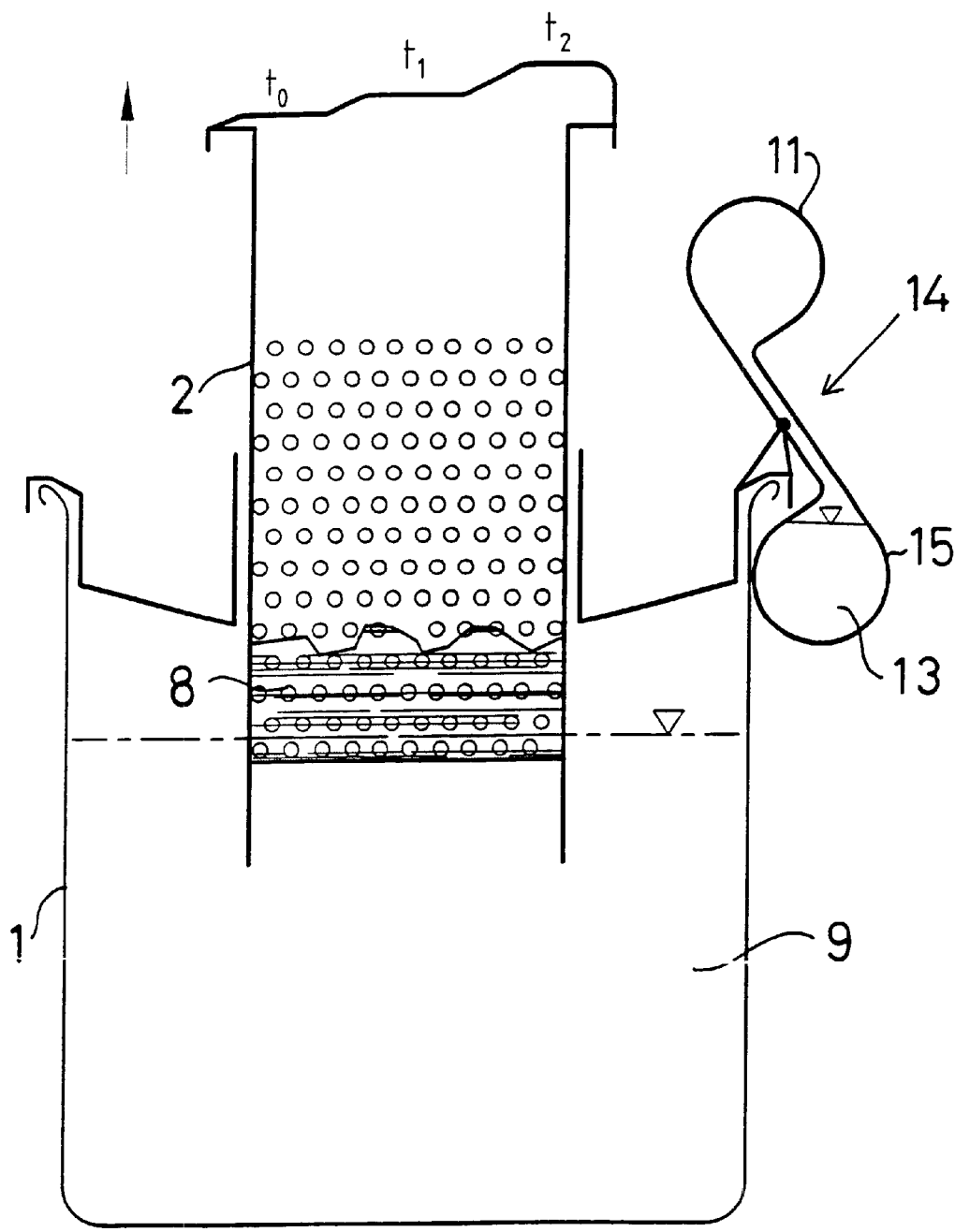
Figure 4:
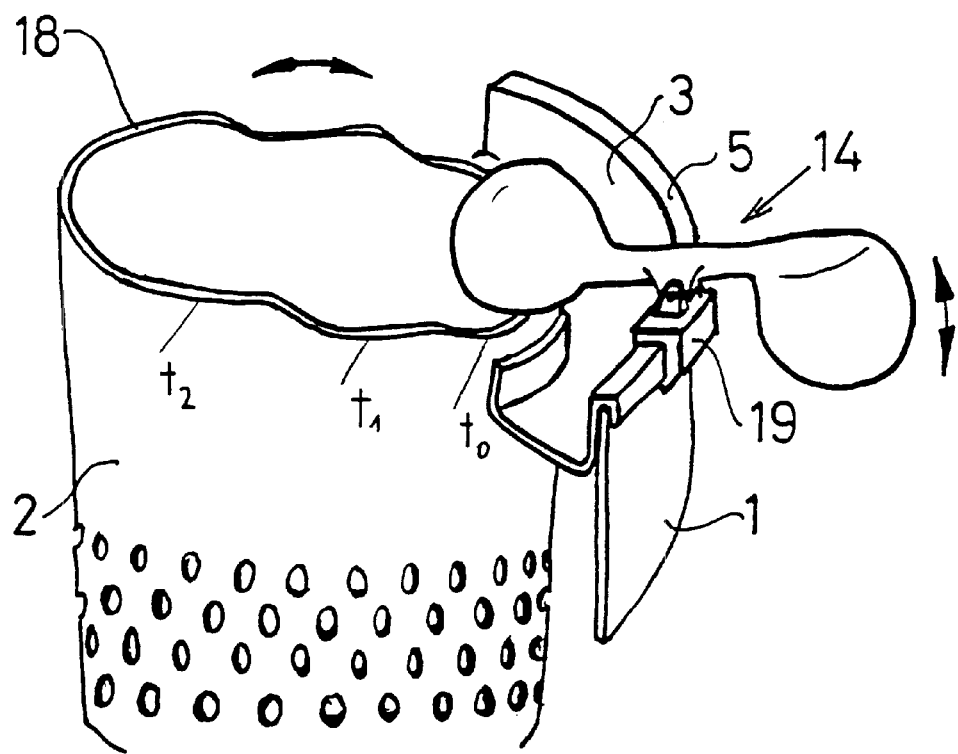
Figure 5:
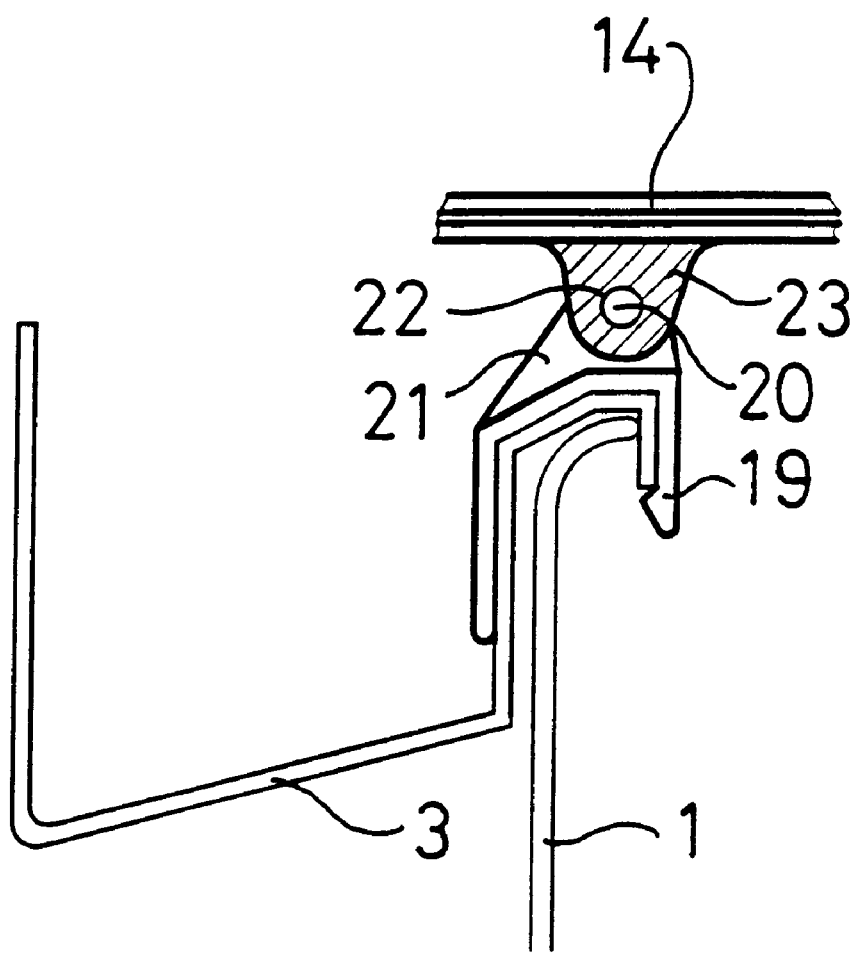
Figure 6:
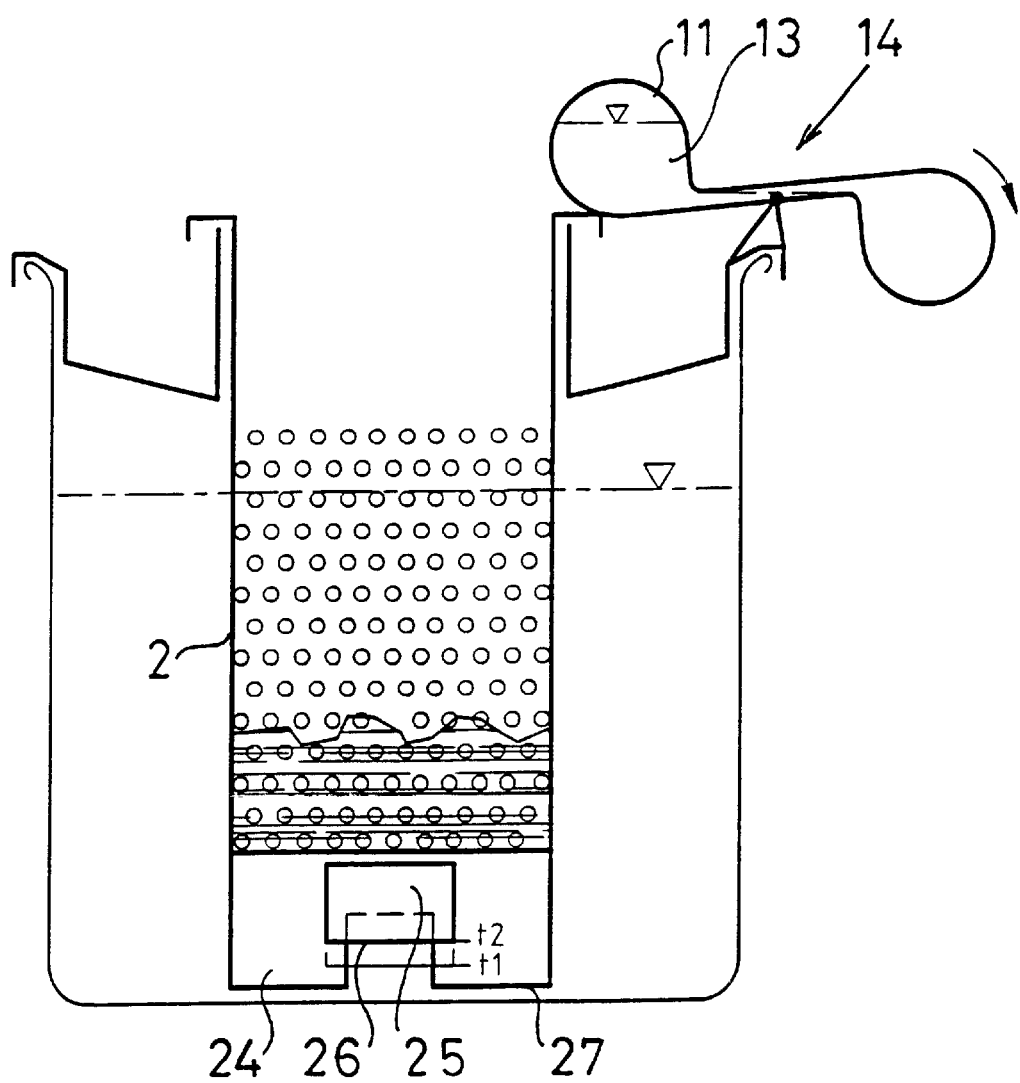
Figure 7:
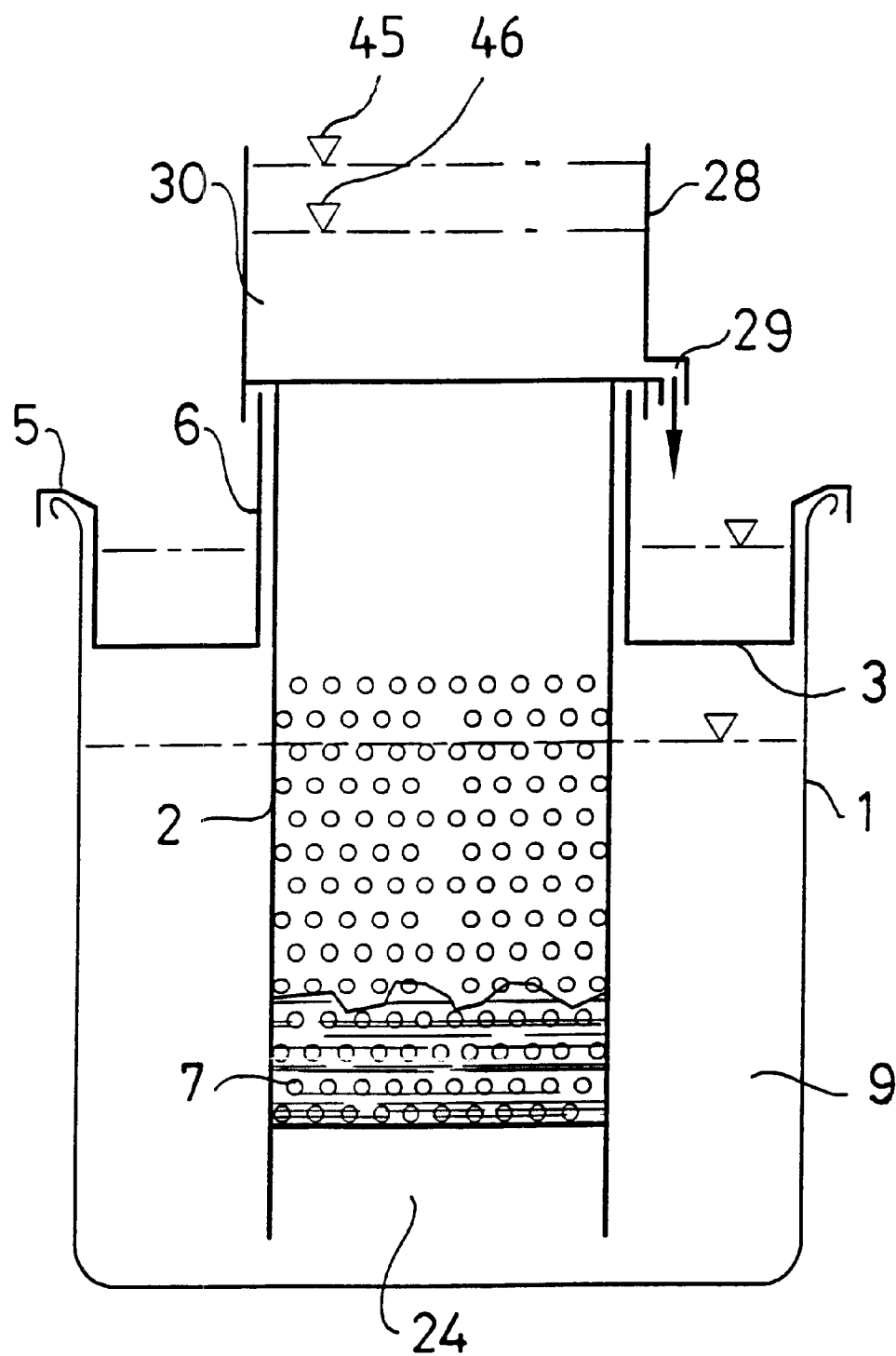
Figure 8:
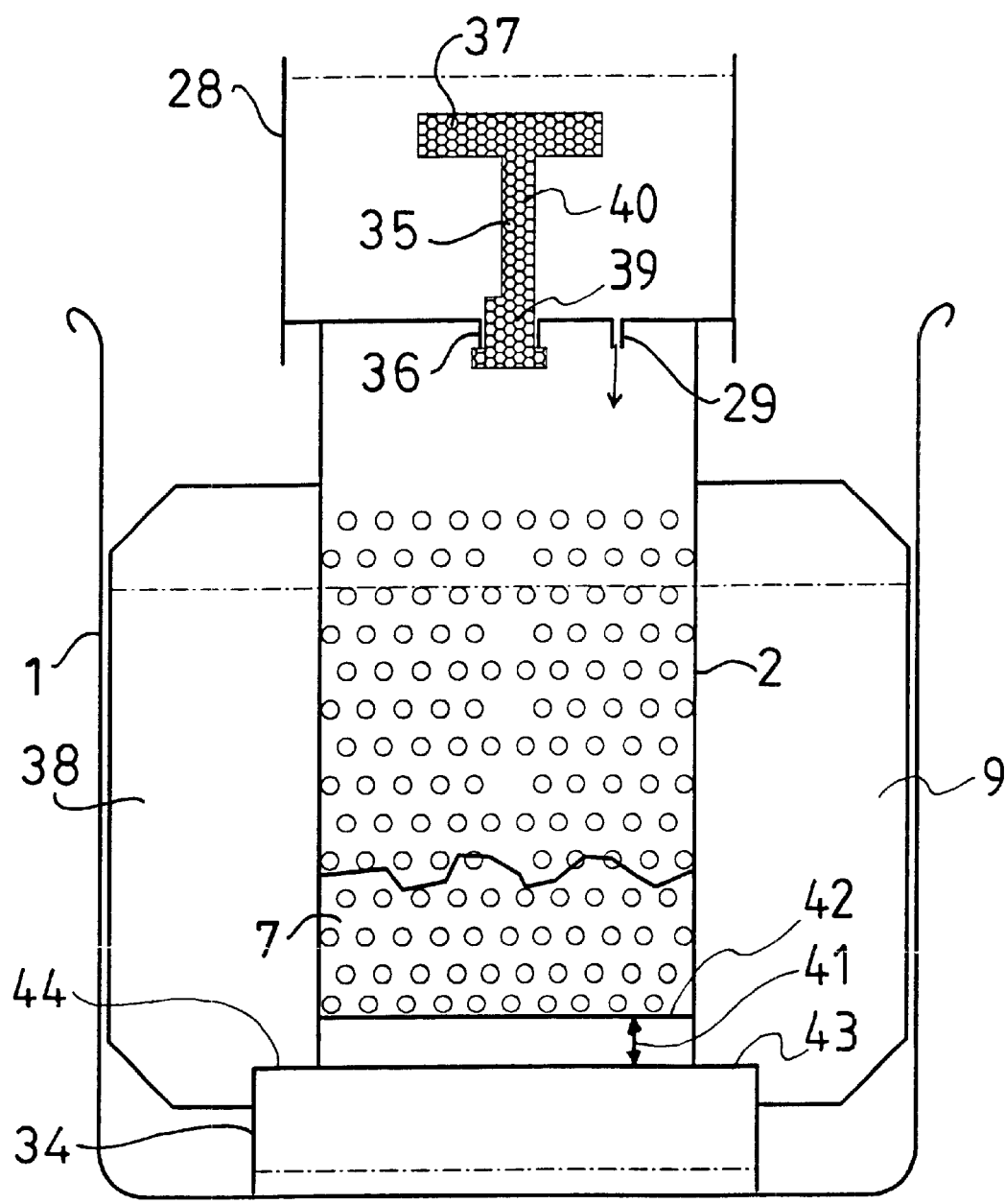
Figure 9:
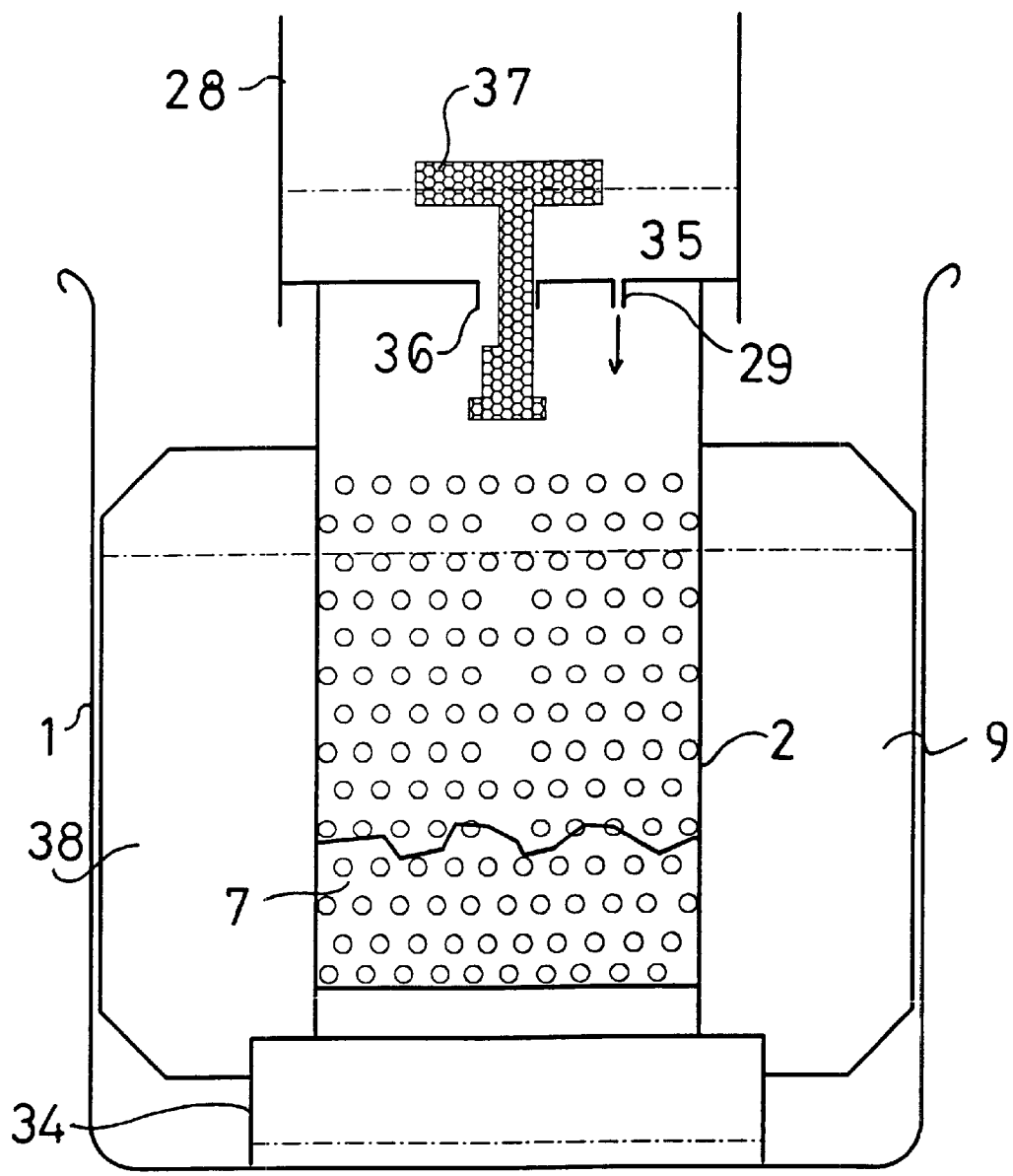
Figure 10:
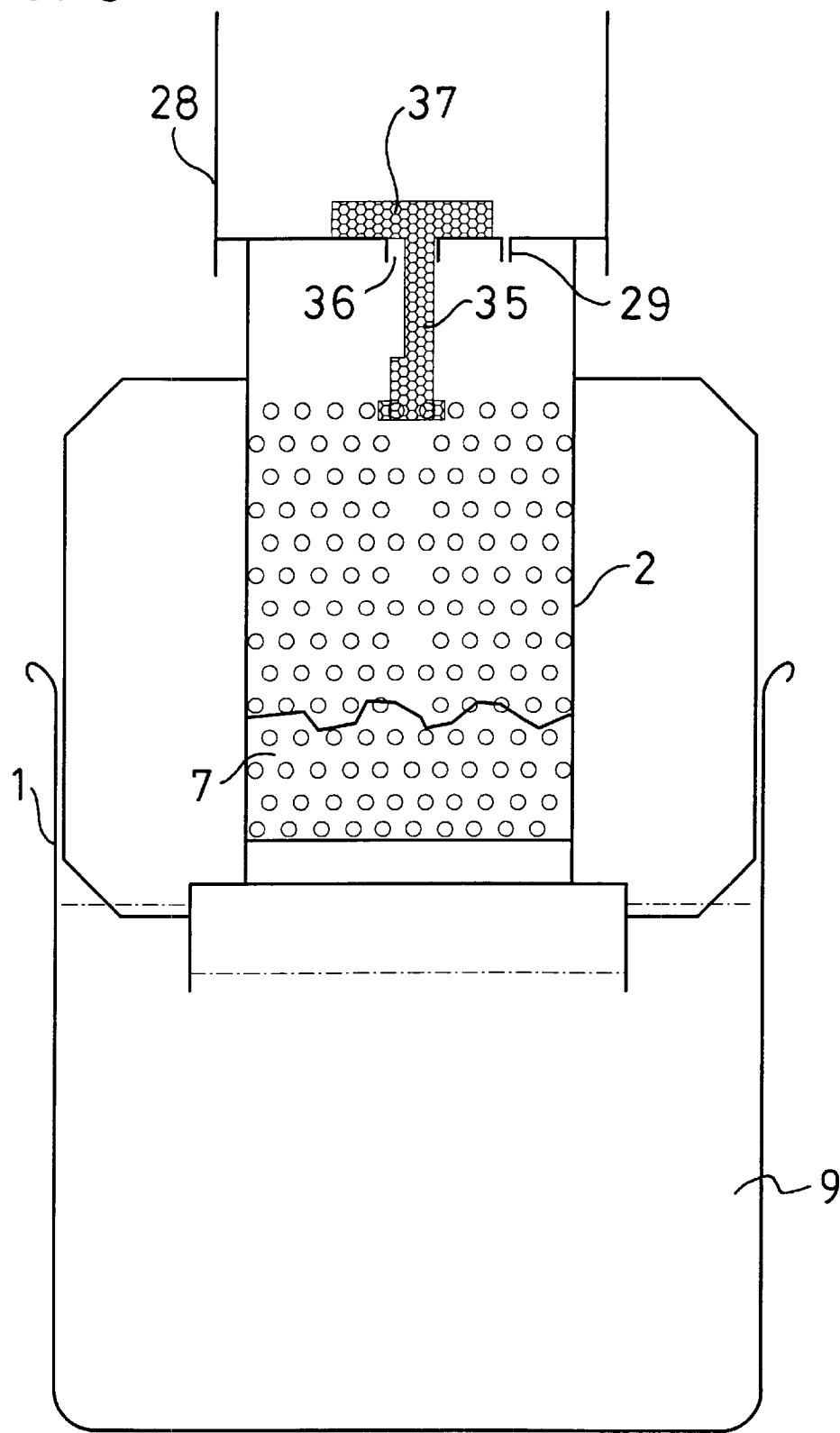
Figure 11:
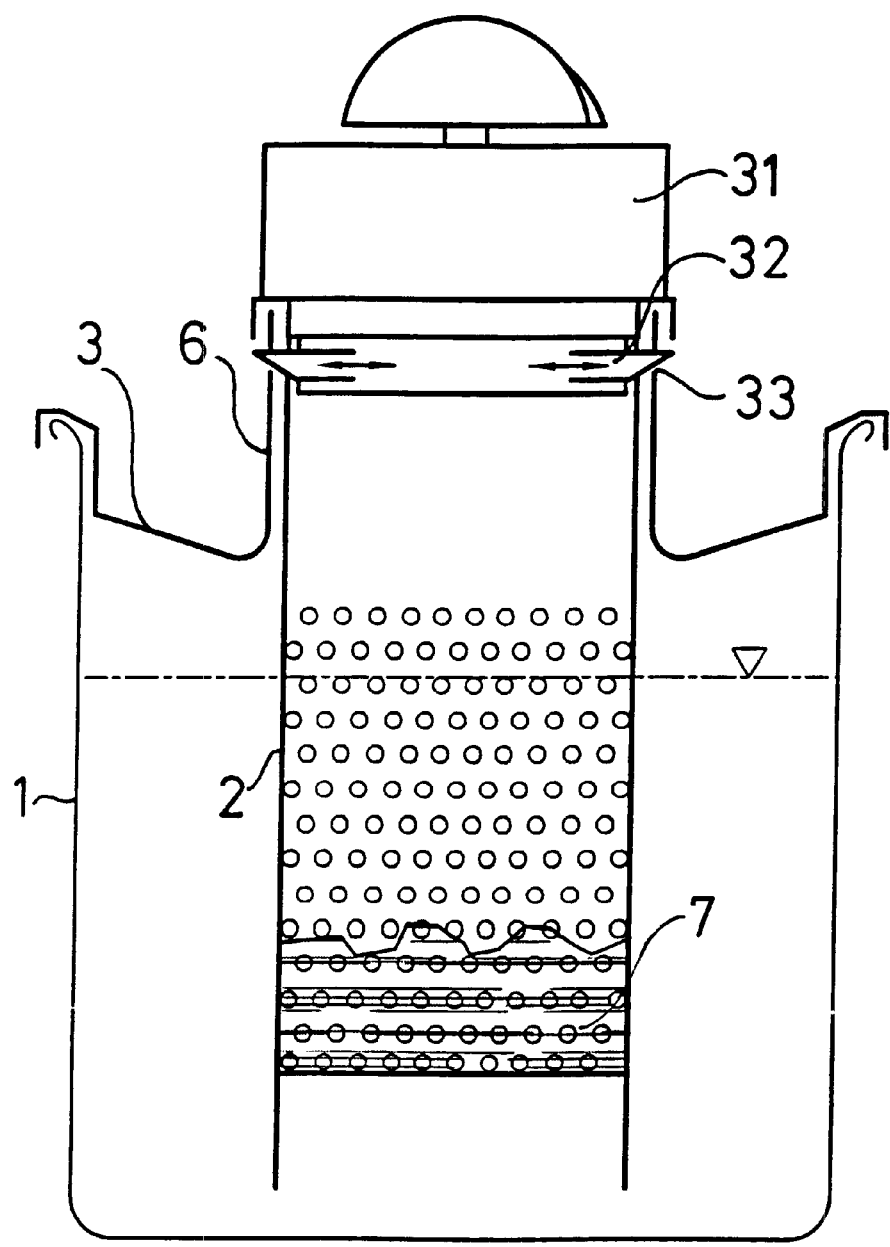

The drawings show various embodiments of the device. These devices will be described below in detail and their mode of functioning explained with reference to these drawings, in which:

FIG. 1: is a cross-section of a first embodiment of the device with a weighing-down element similar to an hourglass, shown in the starting position before the brewing process begins;

FIG. 2: is a cross-section of the embodiment of FIG. 1, shown whilst the brewing process is in progress;

FIG. 3: is a cross-section of the embodiment of FIG. 1 at the end of the brewing process, after the brewing liquid and the material requiring brewing have been completely, or almost completely, separated;

FIG. 4: is a perspective view of the weighing-down element and the insert ring with the shifting gate for setting the brewing time;

FIG. 5: is a rocker for a weighing-down element that can be clipped over the edge of the brewing receptacle and its insert ring;

FIG. 6: shows a first alternative solution, still with the same use of the weighing-down element, but with means for selecting different buoyancy forces for the brewing sieve, in the starting position;

FIG. 7: shows a cross-section of a second alternative solution with a weighing-down element in the form of a container filled with water, at the start of the brewing process;

FIG. 8: shows a cross-section of a more sophisticated embodiment of the device with a liquid container as the weighing-down element, at the start of the brewing process;

FIG. 9: shows a cross-section of the embodiment of FIG. 8, shortly before the end of the brewing period;

FIG. 10: shows a cross-section of the embodiment of FIG. 8, at the end of the brewing time;

FIG. 11: shows a cross-section of an embodiment of the device with a timer and locking mechanism to hold down the brewing material holder, at the start of the brewing process.

DETAILED DESCRIPTION OF THE DRAWING AND PREFERRED EMBODIMENTS

FIG. 1 shows the first embodiment of the device. It includes of a brewing receptacle 1, an insert ring 3 and a brewing sieve 2, which, in this case, is comprised of a porous holder 2 which accommodates the material 7 requiring brewing. In all the embodiments, the brewing receptacle itself may be a teapot or a jug of tea or even an individual drinking vessel or other receptacle. Brewing receptacle 1 which is shown here as cylindrical, can therefore also bulge out at the bottom, and will hold between about ½ liter to about 2 liters, although even larger volumes are conceivable. At its outer limit, insert ring 3 forms a wall 4, which becomes an edge 5 that is turned down towards the outside so that insert ring 3 can be slipped over the edge of brewing receptacle 1, as shown in the drawing. At its inner limit, insert ring 3 has another wall 6 that forms a neck 6, which acts as a guide for holder 2, which is introduced into this insert ring 3. Hence holder 2 can be displaced up and down inside neck 6. Holder 2 is preferably made of plastic or sheet metal and is porous, e.g. as a result of being perforated, as shown here, or of having slits. The side wall of holder 2 projects downwards beyond base 8 by a certain amount. This creates a hollow space 24 underneath it which is open towards the bottom but closed off at the sides, in which air is entrapped when brewing sieve 2 is submerged. This air bubble then generates a buoyant force which acts on brewing sieve 2. To achieve even greater buoyancy, the hollow space 24 underneath brewing sieve 2 can be contrived so that its outer walls extend a good way beyond the top diameter of holder 2, so that it entraps a correspondingly larger volume. Instead of a hollow space, a float or an enclosed, gas-tight hollow space can also be clipped onto holder 2 as a separate part, or fixed to it permanently, in order to create the necessary buoyancy. In this example, brewing receptacle I is filled with brewing liquid 9, with the level 10 being indicated by a triangle. Hence when holder 2 is submerged in the liquid, it experiences a buoyant force because of the air bubble trapped underneath it, and therefore tries to rise upwards along neck 6 of insert ring 3. This is prevented by means of a weighing-down element 11, which, in this case, rests on the edge of holder 2 or on a lid or ring on top of the latter. This weighing-down element 11 has an opening 12, through which the medium 13 which it contains can escape. This continuously lightens weighing-down element 11, until its weight is less than the buoyant force acting on submerged holder 2. Holder 2 can then rise upwards, lifting weighing-down element 11 up at the same time and swinging it away, as in this example. Weighing-down element 11 is namely contrived here as a rocker 14 with, disposed at each end and connected with each other via a channel 16, two hollow bodies 11,15, with rocker 14 being pivotable in the vertical plane around the outer edge 5 of insert ring 3. In the starting position, hollow body 11 closest to brewing receptacle 1 weighs down holder 2 by means of its contents, and outer hollow body 15 is then disposed in a lower position so that medium 13 flows or runs into the latter. To prevent insert ring 3 from being lifted by the buoyant force exerted indirectly on it, it is either contrived to be sufficiently heavy, or held in place over the edge of the brewing receptacle by means of clips. The medium inside hollow bodies 11,15 may be a liquid or any loose material that will run. This rocker 14 is preferably made from a sealed plastic or glass element as used e.g. for hourglasses. The two hollow bodies 11,15 are connected via a channel 16 to form one piece. Placed on the top edge of holder 2 or brewing sieve 2 there is a time-setting element in the form of a ring 17 with a shifting gate 18. Shifting gate 18 is formed by an edge of different heights contrived on ring 17. This ring 17 can be twisted on top of holder 2 to position a section with a higher or lower edge 18 opposite rocker 14. In the example shown here three different edge heights are visible. The edge height designated as $t_0$ defines a starting position in which the medium 13 in hollow body 11 stays in place because there is no inclination of rocker 14 that would cause the contents to flow or run. The two other edge heights correspond with two pre-selectable periods of time, $t_1$ and $t_2$, for the brewing time. When weighing-down element 11, which is filled with medium 13, abuts against the edge designated as $t_0$ in the starting position shown here, this is the setting for the starting position in which nothing happens. If weighing-down element 11 abuts against edge section $t_1$, the incline of rocker 14 between the first hollow body 11 to the second hollow body 15 is minimal. The medium therefore flows or runs slowly out of hollow body 11 into hollow body 15, whereupon hollow body 11 naturally grows lighter and lighter, until its weight finally falls below the buoyant force acting on holder 2 or brewing sieve 2. Holder 2 then rises up, thereby lifting the material requiring brewing 7 almost completely out of the brewing liquid, which interrupts or ends the brewing process. Hollow body 11 is pushed upwards as a result, and rocker 14 is swung away clockwise, as shown in the drawing. In this example, the entire rocker 14 is clipped over the edge 5 of insert ring 3. To start a new brewing operation rocker 14 is removed and manually pivoted in the other direction until medium 13 has flowed or run back into the first hollow body 11. Brewing water is then poured into brewing receptacle 1, the material requiring brewing 7 is place in the brewing sieve, i.e. in holder 2, which is then submerged in brewing liquid 9. Rocker 14 is then positioned on edge 5 opposite the required edge section $t_1$ or $t_2$ of the time-setting element and hollow body 11 is positioned against edge 18 of the time-setting element. Ready! The rest of the operation now proceeds automatically. The user has no need either to watch the clock, nor do anything at the end of the brewing time to interrupt the brewing process.

FIG. 2 shows the same device during the brewing process, with the shortest brewing time, $t_2$, being pre-selected by positioning the section of the timesetting element with the highest edge, $t_2$, opposite rocker 14. In comparison with its position at edge section $t_1$, rocker 14 is much more inclined and medium 13 flows correspondingly faster out of hollow body 11 into hollow body 15. Hollow body 11, which functions as the weighing-down element, is therefore relieved faster and hence the weight acting on holder 2 or the brewing sieve is no longer sufficient to compensate for the buoyant force. Holder 2 therefore rises further and further up in the brewing liquid.

FIG. 3 shows the situation at the end of the brewing process. Rocker 14 has been swung away to the side and all of medium 13 that was originally inside hollow body 11 is now in hollow body 15. In fact, as soon as hollow body 11 emptied sufficiently for its weight to fall below the buoyant force exerted on brewing sieve 2, holder 2 began to rise up and swung rocker 14 away to the side. This in turn cleared the way for holder 2, driven by its biolyant force, to rise up even further out of brewing receptacle 1, thereby also lifting the material requiring brewing 7 completely, or almost completely, out of brewing liquid 9. To ensure that brewing liquid 9 is completely separated from the material requiring brewing when brewing sieve 2 is in this position, the bottom edge portion of brewing sieve 2, which is shown here still submerged in brewing liquid 9, can be contrived with a continuous wall without any perforations.

FIG. 4 shows a perspective view of the special embodiment of rocker 14 with the weighing-down element, as well as of insert ring 3 with shifting gate 18 for setting the brewing time. In this case, holder 2 itself is contrived with an edge 18 that forms a shifting gate which can act as a time-setting element for the three selectable variants $t_0, t_1, t_2$ shown here. By turning holder 2 in brewing receptacle 1, the required edge height can be positioned opposite rocker 14. In this example, rocker 14 can be clipped on top of edge 5 of insert ring 3. For this purpose it is provided with a gripping foot 19 with a horizontal pivot axis at the top, on which rocker 14 is pivotably mounted.

FIG. 5 is a detailed cross-section, viewed from the side, of this gripping foot 19 with its pivot axis shown clipped over the edge of insert ring 3. Pivot axis 20 may e.g. be a one-piece plastic part together with gripping foot 19, with pivot axis 20 being formed by two separate stubs 20 that point away from each other and are each moulded onto an arm 21. The two arms 21 can easily be pressed towards each other so that stubs 20 can be inserted in holes 22 on the supporting element 23 of rocker 14.

FIG. 6 shows an alternative embodiment of a device for brewing beverages. Here, too, brewing sieve 2 is held down by a weighing-down element 11 which grows continuously lighter as the medium 13 inside flows or runs away. In contrast to the embodiments shown in FIGS. 1 to 4, however, the brewing time is set solely by adjusting the buoyant force acting on holder 2. For this purpose the hollow, bottom portion 24 of the holder has a sealing slide 25 in its side wall, which can be moved up and down. The further this slide 25 is pushed upwards, the higher up lies its bottom edge, via which, during the submerging operation, the air below this edge escapes out of the hollow space and rises up through the brewing liquid. When slide 25 is right down, and its bottom edge 26 is flush with the bottom edge 27 of holder 2, the largest air bubble is entrapped in hollow space 24. The correspondingly large buoyant force pushes rocker 14 into a sharply inclined position and medium 13 runs or flows correspondingly quickly out of hollow body 11, after which the latter is soon pushed aside and pivoted away by the rising holder. In the top position shown here, however, the smallest volume of air is entrapped. The buoyant force is just sufficient to tilt rocker 14 into a slightly inclined position so that the medium runs or flows slowly out of hollow body 11. The brewing process is finished at the end of time period $t_2$. An intermediate position, $t_1$, designates a medium brewing time, $t_1$. The slide can, however, also be pushed into any intermediate position that is desired.

FIG. 7 shows another embodiment of a device for brewing beverages. In this case, holder 2 is a perforated plastic or sheet metal container which has a hollow space 24 open towards the bottom on its underside and is guided inside an insert ring 3 having an outer support edge 5 and an inner neck 6, which can be clipped over the edge of the brewing receptacle. This holder 2 can, however, also be made lighter than water itself by fabricating it out of an appropriate material, or by equipping it with a float. In this example, the weighing-down element consists of an upwardly open container 28 filled with water, which is placed on top of holder 2 and is equipped with an outlet opening 29 at the bottom, through which the water 30 contained in the weighing-down element can flow into insert ring 3. In most cases, container 28 will hold a volume of 100 ml to 200 ml, depending on the buoyancy and the weight of holder 2. The insert ring may also be perforated, so that the water which flows out of container 28 drips into brewing liquid 9. Given the minimal volume of this weighing-down water, it has virtually no impact on the tea but does, however, facilitate the handling of the device because the water that would otherwise collect inside insert ring 3 could be spilt when insert ring 3 is removed. In use, holder 2, which is filled with the material requiring brewing 7, is submerged through insert ring 3 into brewing liquid 9 in brewing receptacle 1, and container 28 is placed on top of holder 2 and filled to a level that coincides with the required brewing time. Finished! This figures shows two fill levels 45, 46, namely one, 45, for a maximum brewing time, and one, 46, for a reduced brewing time. The greater the volume of liquid that has to flow out of container 28 through opening 29 into insert ring 3, the longer it takes until container 28, and hence holder 2 as well, is relieved of the weight of the water in container 28, so that the buoyant force acting on holder 2 exceeds both its weight and the weight of container 28. When this point is reached, holder 2 begins to rise up, and the brewing process ends as soon as the material requiring brewing 7 is lifted out of brewing liquid 9.

FIG. 8 shows a cross-section of a more sophisticated embodiment of the device with a liquid container as the weighing-down element, with this Figure showing the initial situation at the start of the brewing process. Here again, the weighing-down element comprises an upwardly open container 28 filled with water, which rests on top of holder 2, with an outlet opening 29 at the bottom through which the water 30 contained in the weighing-down element does not, however, drip into the insert ring, but directly into the liquid above the material requiring brewing. Holder 2 stands on a base 34 that is open towards the bottom, which, when submerged in the brewing liquid, entraps a bubble of air that provides the buoyant force acting on holder 2 in the brewing liquid. This downwardly open base 34, which fulfils the same function as the hollow space 24 of FIG. 1, can, however, also be contrived as an enclosed hollow space, or can be made of a foamed plastic, or of cork, in order to generate the necessary buoyant force. Between the top edge 43 of this part 34 that generates the buoyant force, and the bottom edge 42 of the perforated wall, a sufficiently large gap 41 is contrived to ensure that when holder 2 floats to the top of the liquid, the material for brewing 7 is completely isolated from the brewing liquid. To guide holder 2 inside brewing receptacle 1, holder 2 is provided with radially projecting guide ribs 38. These guide ribs 38 are also contrived with recesses 44 for engaging with base 34 and holding it in place. As a special feature, disposed in container 28 there is a stopper 35, which seals off, from the underside, a downwardly projecting stopper hole 36 provided in the floor of the container. Stopper 35 is contrived as a float in that it is made from a lightweight material and is also provided with a float plate 37 at the top to increase its buoyant force. The bottom section of stopper 35 has a round cross-section 39 whilst the top section has a reduced round cross-section 40. To start the brewing process, holder 2 with the material requiring brewing 7 is inserted into brewing receptacle 1, which is filled with brewing liquid. Holder 2 only dips slightly in the brewing liquid because of the buoyant force exerted by base 34. This situation is shown in FIG. 10 and also coincides with the same situation as at the end of the brewing process. Container 28 is then placed in position and filled with more or less liquid, depending on the desired brewing time. As a result of filling container 28, holder 2 submerges into brewing receptacle 1 until it stands upright at the bottom of the receptacle because the weight of the filled container 28 is greater than the buoyant force. Stopper 35 together with its float plate 37 are fully submerged. The buoyant force of float plate 37 lifts the stopper upwards and as a result it blocks stopper hole 36 from below. Water now drips or runs slowly through outlet 29 into the brewing liquid. This situation is shown in FIG. 8.

As soon as the water level in container 28 falls to a level at which stopper 35 is no longer capable of sealing stopper hole 36, the water escapes rapidly through the large stopper hole 36 into the brewing liquid, thereby quickly reducing the weight of the weighing-down element so that holder 2 rises up equally quickly. This situation, just before the end of the brewing period, is shown in FIG. 9.

At the end of the desired brewing period, the weighing-down element therefore abruptly becomes lighter, and holder 2 floats equally quickly upwards, thereby lifting the material requiring brewing 7 completely out of brewing liquid 9, as shown in FIG. 10. Once container 28 is completely empty, stopper 35 hangs by its top sealing plate in stopper hole 36 and the material requiring brewing 7 is completely lifted out of brewing liquid 9. This stopper device ensures that the material requiring brewing 7 is not slowly and continuously lifted out of brewing liquid 9 throughout the entire brewing time, but rather that all the material requiring brewing 7 remains in liquid 9 throughout the entire brewing time, and, at the end of the latter, is lifted quickly and completely out of the liquid in its entirety. The advantage of ensuring that the holder rises up quickly in just a few seconds is that the brewing process is interrupted with precision. For the tea drinker and consumer, this abrupt interruption is indicative of an optimum tea-preparing process that is in fact identical to the manual procedure, with the exception that in this case, it is automatic.

Finally, FIG. 11 shows quite a different embodiment of the device. Here too, holder 2 for the material requiring brewing 7 has a lighter specific weight than water, and can be introduced into brewing receptacle 1. Furthermore, there is a triggering mechanism 31 with a timer, which sits on top of holder 2 and insert ring 3. For this purpose it is important that the overall structure consisting of insert ring 3, holder 2 and mechanism 31 with the timer, is heavier than the buoyant force acting on holder 2, because the latter would otherwise be lifted up together with mechanism 31 and insert ring 3. In the starting position, spring-loaded locking bars 32 engage in recesses 33 in neck 6 of insert ring 3. Mechanism 31 incorporates a mechanical or battery-driven electric timer, by means of which, at the end of a pre-selectable period of time, by the triggering of pawls, locking bars 32 can be withdrawn from recesses 33 by virtue of the springs acting on them. This releases holder 2, thereby allowing it to float upwards. Seen as a horizontal projection, these locking bars 32 are most advantageously arranged in a star shape, so that they move radially outwards from the centre of holder 2 as a result of the springs acting on them. It is preferable to use three star-shaped disposed locking bars 32.

What is claimed is:
1. An apparatus for brewing beverages, comprising:
a brewing receptacle;
a brewing sieve for said brewing receptacle, said brewing sieve being a porous holder formed as a perforated plastic container or a sheet metal container for material requiring brewing, said container being submergable in a brewing liquid and being introducible into said brewing receptacle and having a lighter specific weight than water, or having on its underside a hollow space for entrapping a bubble of air rising up in the brewing liquid, or a float made from foamed plastic or cork, said porous holder being guided inside said brewing receptacle;
weighing-down means being an upwardly open container filled with water, said upwardly open container having an opening at its bottom through which water in said upwardly open container, for initially weighing down said porous holder, is intended to flow through, said upwardly open container further including a stopper hole with an associated floating stopper for being able to seal the stopper hole from underneath, so that, once water falls below a predetermined level in a pre-set length of time in said upwardly open container, said floating stopper comes out of said stopper hole so that said upwardly open container is drainable through the stopper hole and is thereby able to be relieved by lightening so that said porous holder rises upwardly by virtue of its own buoyancy and ensuring that, once said porous holder has floated upwardly, the material requiring brewing is completely isolated from the brewing liquid.
2. The apparatus for brewing beverages according to claim 1, wherein when said porous holder has floated to the surface of the water, a gap is observed between the bottom end of perforations in said porous holder and the level of brewing liquid, thereby ensuring that once said porous holder has floated to the top, the material requiring brewing is completely isolated from the brewing liquid.
3. The apparatus for brewing beverages according to claim 1, wherein said weighing-down means comprises a hollow body filled with a medium that will run or flow, and in that said medium is able to run or flow at a pre-selectable speed through an opening out of said hollow body and into another hollow body, so that said weighing-down means grows continuously lighter until its weight falls below the buoyant force acting on said submerged porous holder.

4. An apparatus for brewing beverages, comprising:

a brewing receptacle;

a brewing sieve for said brewing receptacle, said brewing sieve being a porous holder for material requiring brewing, which has a lighter specific weight than water or is submergable in a brewing liquid, and being introducible into said brewing receptacle, for entrapping a bubble of air which rises up in the brewing liquid, said porous holder being a perforated plastic or sheet metal container which, on its underside, has a downwardly open, laterally closed off hollow space for entrapping an air bubble as it is submerged, or has a float made from foamed plastic or cork, and which is guided inside an insert ring with an outer support edge and an inner neck that is able to be clipped over the edge of said brewing receptacle; and, weighing-down means formed as a hollow body filled with a medium that will flow, said hollow body having an opening at its bottom through which said medium in said hollow body, for initially weighing down said porous holder, is intended to flow through, and in that said medium is able to flow at a pre-selectable speed through an opening out of said hollow body and into another hollow body, together with the material requiring brewing in the brewing liquid in said brewing receptacle for a pre-set length of time, and which, at the end of said pre-set period, is able to be relieved by a continuous lightening of said weighing-down means until its weight falls below the buoyant force acting on said submerged porous holder, said weighing-down means further comprising a rocker with, disposed at each end and connected with each other via a channel, two hollow bodies with said rocker being pivotable in a vertical plane around the outer edge of said insert ring, with, in a starting position, said hollow body closest to said brewing receptacle weighing down said porous holder, and the outer hollow body being disposed in a lower position so that medium flows into the latter.

5. The apparatus for brewing beverages according to claim 4, said rocker is removably clipped onto an edge of said insert ring, and in that the hollow bodies and the channel connecting them are made from an enclosed plastic or glass element in the manner of an hourglass.

6. The apparatus for brewing beverages according to claim 4, wherein to set the brewing time, the downwardly open, laterally sealed hollow space on said porous holder is adjustable via a watertight vertically displaceable slide in a side wall, in that a bottom edge of said slide forms an uppermost point in the bottom edge of hollow space, so that, depending on the position of said slide, air can be trapped in a hollow space when said porous holder is submerged.

7. The apparatus for brewing beverages according to claim 4, wherein porous holder is a perforated plastic container or a sheet metal container, which, on its underside, has a hollow space or a float made from foamed plastic or cork and is guided inside said brewing receptacle, and in that said weighing-down means are formed by an upwardly open container filled with water, which is able to be on top of said porous holder and has an opening at its bottom, through which water in said upwardly open container for initially weighing down said porous holder is intended to flow away.

8. The apparatus for brewing beverages according to claim 7, said upwardly open container further includes a stopper hole with an associated floating stopper for being able to seal the stopper hole from underneath, so that, once water falls below a predetermined level in said upwardly open container, said floating stopper comes out of the stopper hole so that upwardly open container is drainable through the stopper hole.

9. The apparatus for brewing beverages according to claim 4, wherein when said porous holder has floated to the surface of the water, a gap is observed between the bottom end of perforations in said porous holder and the level of brewing liquid, thereby ensuring that once said porous holder has floated to the top, the material requiring brewing is completely isolated from the brewing liquid.

10. An apparatus for brewing beverages, comprising:

a brewing receptacle;

a brewing sieve for said brewing receptacle, said brewing sieve being a porous holder for material requiring brewing, which has a lighter specific weight than water or is submergable in a brewing liquid, and being introducible into said brewing receptacle, for entrapping a bubble of air which rises up in the brewing liquid, and;

weighing-down means formed as a hollow body filled with a medium that will flow, said hollow body having an opening at its bottom through which said medium in said hollow body, for initially weighing down said porous holder, is intended to flow through, and in that said medium is able to flow at a pre-selectable speed through an opening out of said hollow body, said hollow body being a first, inner hollow body, and into a second, outer hollow body, together with the material requiring brewing in the brewing liquid in said brewing receptacle for a pre-set length of time, and which, at the end of said pre-set period, is able to be relieved by a continuous lightening of said weighing-down means until its weight falls below the buoyant force acting on said submerged porous holder, wherein placed on top of said porous holder there is a ring with an edge of varying heights, which is twistable on top of said porous holder for producing adjustable starting positions of different heights, via which said first, inner hollow body abuts against said ring, thereby ensuring that said medium flows out of the hollow body at different, pre-selectable speeds.

11. The apparatus for brewing beverages according to claim 10, wherein porous holder is a perforated plastic container or a sheet metal container, which, on its underside, has a hollow space or a float made from foamed plastic or cork and is guided inside said brewing receptacle, and in that said weighing-down means are formed by an upwardly open container filled with water, which is able to be on top of said porous holder and has an opening at its bottom, through which water in said upwardly open container for initially weighing down said porous holder is intended to flow away.

12. The apparatus for brewing beverages according to claim 11, said upwardly open container further includes a stopper hole with an associated floating stopper for being able to seal the stopper hole from underneath, so that, once water falls below a predetermined level in said upwardly open container, said floating stopper comes out of the stopper hole so that upwardly open container is drainable through the stopper hole.

13. The apparatus for brewing beverages according to claim 10, wherein when said porous holder has floated to the surface of the water, a gap is observed between the bottom end of perforations in said porous holder and the level of brewing liquid, thereby ensuring that once said porous holder has floated to the top, the material requiring brewing is completely isolated from the brewing liquid.

\* \* \* \* \*